United States Patent
Grössle et al.

(10) Patent No.: US 7,971,566 B2
(45) Date of Patent: Jul. 5, 2011

(54) PISTON FOR AN INTERNAL COMBUSTION ENGINE AND METHOD FOR ITS PRODUCTION

(75) Inventors: Alexander Grössle, Pfedelbach (DE); Thomas Hoch, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 480 days.

(21) Appl. No.: 12/086,603

(22) PCT Filed: Dec. 14, 2006

(86) PCT No.: PCT/DE2006/002235
§ 371 (c)(1),
(2), (4) Date: Aug. 13, 2008

(87) PCT Pub. No.: WO2007/076802
PCT Pub. Date: Jul. 12, 2007

(65) Prior Publication Data
US 2010/0162986 A1    Jul. 1, 2010

(30) Foreign Application Priority Data
Dec. 17, 2005  (DE) .......... 10 2005 060 547

(51) Int. Cl.
*F02F 3/26* (2006.01)
*F02B 23/06* (2006.01)

(52) U.S. Cl. ................................ 123/193.6

(58) Field of Classification Search .......... 123/193.6, 123/279, 285
See application file for complete search history.

(56) References Cited

U.S. PATENT DOCUMENTS

| | | | | |
|---|---|---|---|---|
| 2,205,493 A | * | 6/1940 | Saurer | 123/276 |
| 3,402,704 A | * | 9/1968 | Witzky et al. | 123/279 |
| 4,207,843 A |   | 6/1980 | List et al. | |
| 4,221,190 A | * | 9/1980 | Komiyama et al. | 123/263 |

(Continued)

FOREIGN PATENT DOCUMENTS

DE   28 15 717   11/1978

(Continued)

OTHER PUBLICATIONS

International Search Report.

*Primary Examiner* — M. McMahon
(74) *Attorney, Agent, or Firm* — Collard & Roe, P.C.

(57) ABSTRACT

The present invention relates to a piston (10) for an internal combustion engine, having a combustion depression (13) which is provided in the piston head (11) and has an encircling undercut (14), wherein the encircling depression edge (15) which connects the undercut (14) to the piston head (11) has alternately rounded (16, 17) and sharp-edged depression edge regions (18, 19). It is provided according to the invention that the encircling depression edge (15) merges along its entire periphery into a planar encircling face (20) which in turn merges along its entire periphery with a sharp edge into the undercut (14). The method according to the invention for producing a piston (10) of the type is characterized in that, in a first method step, a combustion depression with an encircling undercut and with an encircling depression edge is formed in the piston head (11) using a lathe tool, and in that, in a second method step, in order to produce the rounded (16, 17) and sharp-edged depression edge regions (18, 19), the lathe tool is moved radially outwards rectilinearly from the central point of the combustion depression by a defined magnitude.

10 Claims, 2 Drawing Sheets

U.S. PATENT DOCUMENTS

Figure 1:
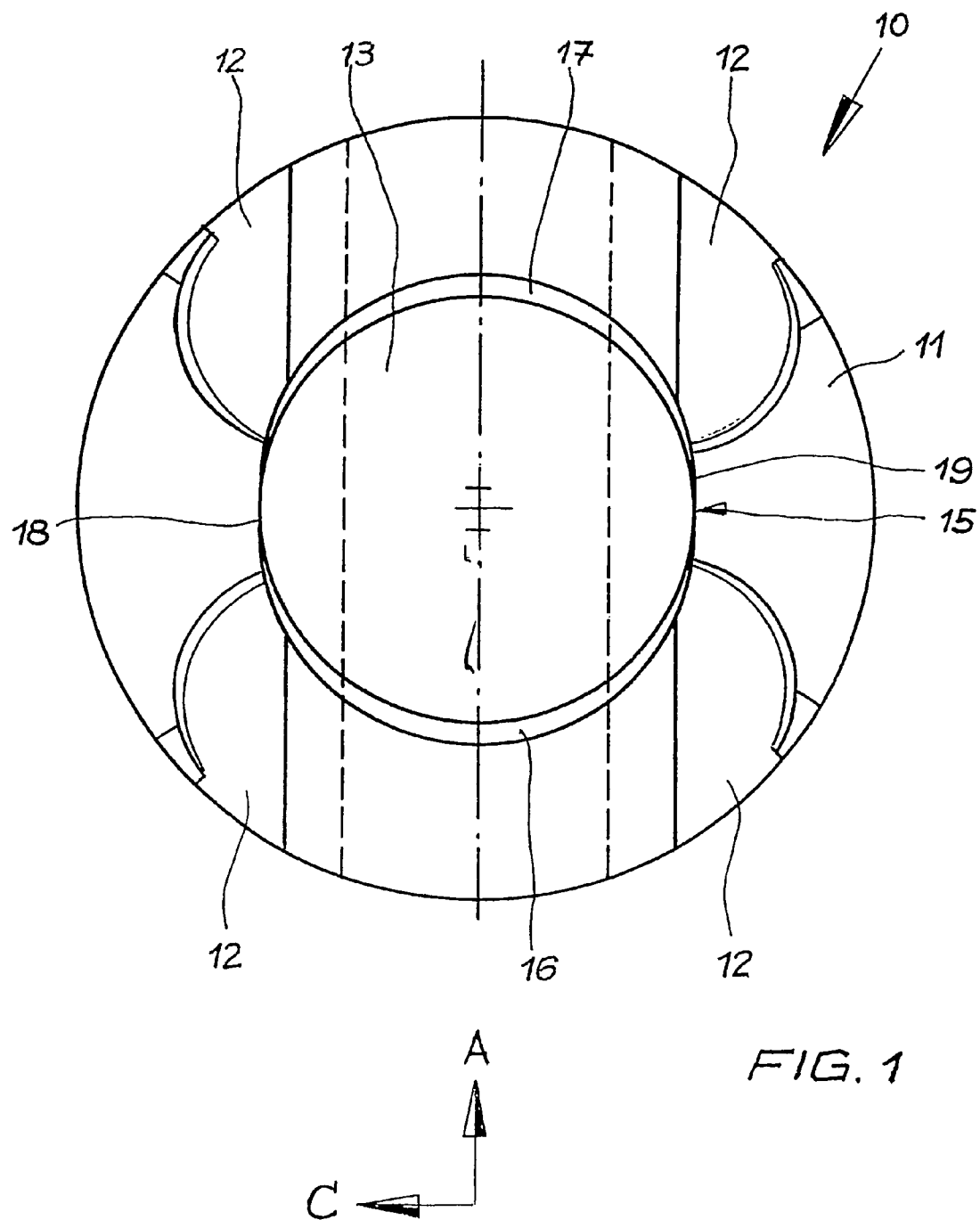

| | | | | |
|---|---|---|---|---|
| 4,883,032 A | * | 11/1989 | Hunter et al. | 123/256 |
| 4,953,528 A | * | 9/1990 | Oikawa et al. | 123/276 |
| 5,029,563 A | * | 7/1991 | Hu | 123/262 |
| 5,099,809 A | * | 3/1992 | Kawatani et al. | 123/276 |
| 5,337,714 A | | 8/1994 | Tracy | |
| 6,732,702 B2 | | 5/2004 | Liu et al. | |
| 6,892,689 B2 | | 5/2005 | Bischofberger et al. | |
| 2005/0092279 A1 | * | 5/2005 | Parker et al. | 123/193.6 |

FOREIGN PATENT DOCUMENTS

| | | |
|---|---|---|
| DE | 199 35 954 | 2/2001 |
| DE | 199 52 868 | 5/2001 |
| DE | 102 61 333 | 1/2004 |
| EP | 0 105 933 | 4/1984 |
| EP | 0 261 538 | 3/1988 |
| EP | 0 453 613 | 10/1991 |
| EP | 0 641 927 | 3/1995 |
| EP | 0 810 365 | 12/1997 |
| EP | 1 343 961 | 9/2003 |
| JP | 57-002446 | 1/1982 |
| JP | 06-221162 | 8/1994 |
| JP | 06-346736 | 12/1994 |
| JP | 07-042559 | 2/1995 |
| JP | 10-184451 | 7/1998 |

* cited by examiner

PISTON FOR AN INTERNAL COMBUSTION ENGINE AND METHOD FOR ITS PRODUCTION

CROSS REFERENCE TO RELATED APPLICATIONS

This application is the National Stage of PCT/DE2006/002235 filed on Dec. 14, 2006, which claims priority under 35 U.S.C. §119 of German Application No. 10 2005 060 547.8 filed on Dec. 17, 2005. The international application under PCT article 21(2) was not published in English.

The present invention relates to a piston for an internal combustion engine, having a combustion bowl provided in the piston crown, which bowl has a circumferential undercut, whereby the bowl edge that connects the undercut with the piston crown alternately has rounded and sharp-edged bowl edge regions.

Both the piston crown and the bowl edge of the combustion bowl of a piston are subject to irregular, superimposed mechanical and thermal tensile and pressure stresses during operation. These stresses particularly act in the piston pin axis and perpendicular to the piston pin axis. Over the course of time, they lead to material fatigue, thereby in turn causing cracks to form.

Numerous configurations of the bowl edge have been proposed to reduce or neutralize the stresses that act on the bowl edge. JP 10184451 shows a combustion bowl whose bowl edge is provided with two recesses, perpendicular to the piston pin axis. In similar manner, the combustion bowl of a piston having undercuts, disclosed in EP 0 261538 B1, is provided with two recesses, but parallel to the piston pin axis, whereby in addition, the combustion bowl is disposed offset relative to the longitudinal piston axis.

It is furthermore known to provide the bowl edge with sharp-edged transitions to the combustion bowl, on the one hand, and to the piston crown, on the other hand, in order to achieve good combustion of the fuel with as little emission of pollutants as possible. EP 0 453 613 A1 describes a piston having a combustion bowl with undercuts, whose bowl edge has a cylindrical section that makes a transition into an outer section that widens conically toward the piston crown.

The disadvantage of such configurations, however, consists in the fact that because of the sharp-edged configuration of the bowl edge, the mechanical stress is increased, and therefore the tendency to form cracks is increased. Therefore EP 0 641 927 A1 proposes at least partially rounding off the bowl edge of a combustion bowl having undercuts, in other words configuring it with different radii, which make a flowing transition into one another. The smaller the radius that is selected, the more sharp-edged the bowl edge. In those regions of the bowl edge in which particularly high stresses occur, the radius is supposed to be selected to be greater than in the other regions of the bowl edge.

DE 199 52 868 A1 discloses a piston having a combustion bowl with undercuts, the bowl edge of which is also configured with different radii. To improve the fuel atomization, the bowl edge additionally has cylindrical sections that make a sharp-edged transition into the combustion bowl and/or into the piston crown. In order to achieve good fuel atomization, however, the injection nozzle has to be oriented in such a manner that its injection openings are oriented toward the cylindrical sections. At the same time, the arrangement of the cylindrical sections must be adapted to the number and arrangement of the injection openings.

The task of the present invention consists in making available a piston that both demonstrates a low tendency to form cracks and allows good fuel combustion, and that can work together with injection nozzles having a different number and/or arrangement of injection openings.

The solution consists in a piston having the characteristics of claim 1 and of a method having the characteristics of claim 12. According to the invention, it is provided that the circumferential bowl edge makes a transition, along its entire circumference, into a planar circumferential surface, which in turn makes a sharp-edged transition into the undercut, along its entire circumference. The method according to the invention is characterized in that in a first method step, a combustion bowl having a circumferential undercut and a circumferential bowl edge is lathed into the piston crown, using a lathe tool, and that in a second method step for the production of the rounded and sharp-edged bowl edge regions, the lathe tool is offset radially outward, in a straight line, by a defined amount, proceeding from the center point of the combustion bowl.

The principle according to the invention therefore consists in the fact that on the one hand, the bowl edge is partially rounded, in order to reduce the tensile and/or pressure stresses that act on it, but on the other hand, a planar circumferential surface is provided below the bowl edge, which serves to atomize the fuel that is injected in the direction of the combustion bowl and impacts the surface, as optimally as possible. In this way, the goal of reducing the risk of crack formation and allowing good fuel combustion is achieved. At the same time, the planar circumferential surface allows using injection nozzles having injection openings in any desired arrangement, so that the configuration of the injection nozzles and the configuration of the combustion bowl do not have to be coordinated with one another.

The method according to the invention represents a particularly simple possibility for producing the piston according to the invention. The configuration of the bowl edge and of the planar circumferential surface is achieved solely by means of the offset of the lathe tool that proceeds from the center point of the combustion bowl, directed radially outward. Complicated subsequent machining of the combustion bowl is therefore not necessary.

Advantageous further developments are evident from the dependent claims.

The height of the planar circumferential surface along the rounded bowl edge region can be less than along the sharp-edged bowl edge regions. This configuration permits a particularly simple production method, because the planar circumferential surface along the rounded bowl edge regions does not have to be offset in the direction of the bottom of the combustion bowl.

Preferably, the regions having a lesser height and the regions having a greater height, of the planar circumferential surface, make a flowing transition into one another, in order to avoid the formation of additional sharp edges that could increase the risk of crack formation. For the same reason, it is advantageous if the rounded and the sharp-edged bowl edge regions also make a flowing transition into one another.

Another advantageous further development provides that the planar circumferential surface forms a cylinder mantle surface, in order to bring about even better atomization of the injected fuel.

The rounded bowl edge regions can have a radius of 2.0 to 3.0 mm, preferably 2.4 to 2.6 mm, for example, while the sharp-edged bowl edge regions can have a radius of 0.5 to 1.5 mm, preferably 0.75 to 1.25 mm. The dimensioning is dependent on the requirements of each individual case, in the final analysis. Accordingly, the lathe tool can be offset by an amount of 0.5 to 2.5 mm, preferably 1 mm to 2 mm, for example.

The center point of the combustion bowl can lie in the piston axis, which means that the combustion bowl is not offset relative to the piston axis.

A practical further development provides that the bowl edge has two rounded bowl edge regions that lie opposite one another in the piston pin axis, and two sharp-edged bowl regions that lie opposite one another perpendicular to the piston pin axis. This configuration can be produced in particularly simple manner, since the lathe tool only has to be offset along the piston pin axis, proceeding from the center point of the combustion bowl, in both directions.

The piston crown can furthermore be provided with one or more valve niches, which cut the circumferential bowl edge in a transition region between a sharp-edged and a rounded bowl edge region, for practical purposes, in order to avoid the formation of additional sharp edges.

In terms of method, in order to produce the combustion, bowl, in a first method step, a combustion bowl having a circumferential undercut and a circumferential bowl edge is lathed into the piston crown, using a lathe tool, whereby in a second method step for the production of the rounded and sharp-edged bowl edge regions, the lathe tool is offset radially outward, in a straight line, by a defined amount, proceeding from the center point of the combustion bowl.

Practical further developments of the method are evident from the additional dependent claims.

Figure 2:
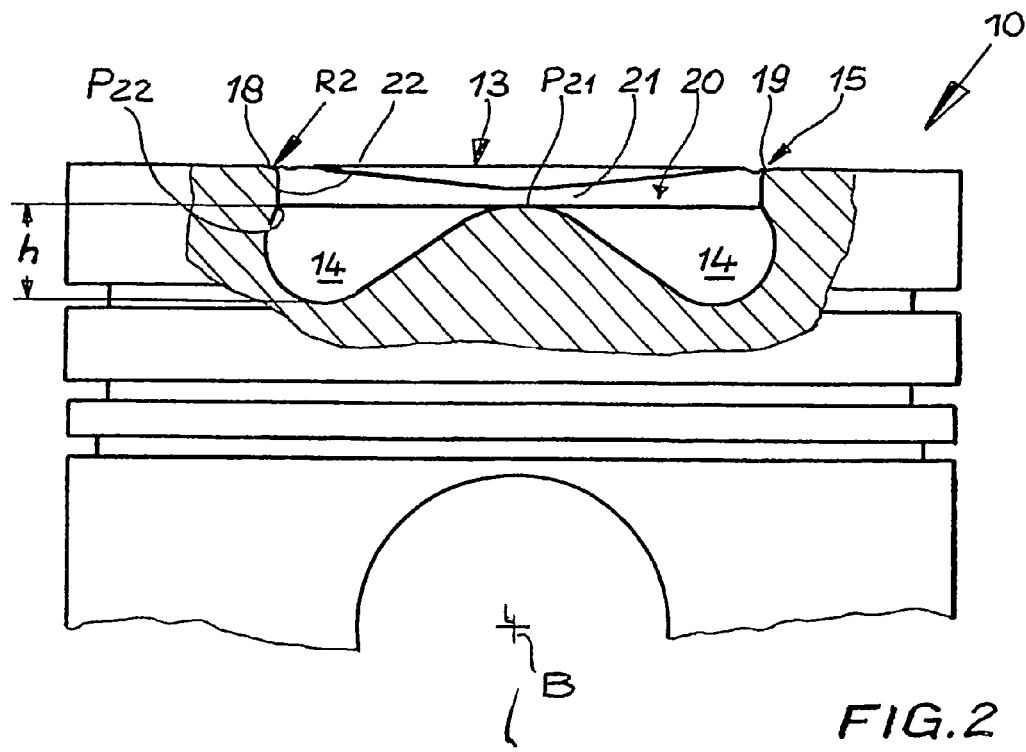
Figure 3:
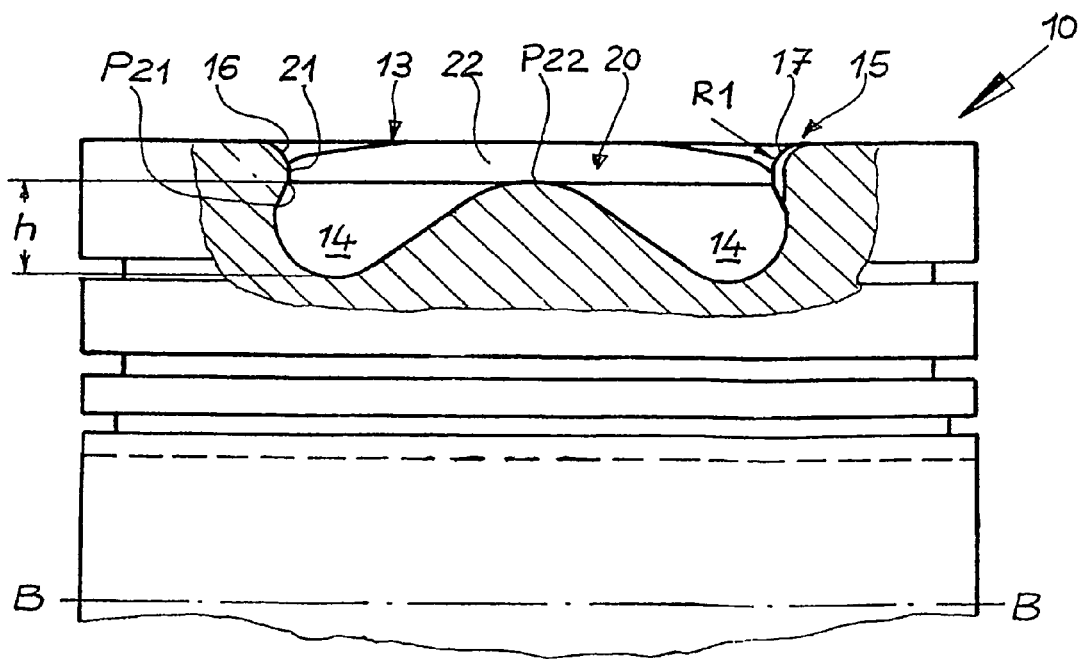

An exemplary embodiment of the invention will be described in greater detail in the following, using the attached drawings. These show, in a schematic representation, not to scale:

FIG. 1 a top view of an exemplary embodiment of the piston according to the invention;

FIG. 2 a side view in the direction of the arrow A in FIG. 1, partly in section;

FIG. 3 a side view in the direction of the arrow C in FIG. 1, partly in section.

FIGS. 1 to 3 show an exemplary embodiment of a piston 10 according to the invention, having a piston crown 11 that is provided with a combustion bowl 13. The center point of the combustion bowl 13 lies in the longitudinal piston axis in the exemplary embodiment, in other words the combustion bowl 13 is not offset relative to the longitudinal piston axis. Four valve niches 12 are disposed in the piston crown 11, between the combustion bowl 13 and the outer edge of the piston crown 11.

The combustion bowl 13 is provided with a circumferential undercut 14 (see FIGS. 2 and 3). The circumferential bowl edge 15 of the combustion bowl 13 has two rounded bowl edge regions 16, 17 and two sharp-edged bowl edge regions 18, 19. The rounded bowl edge regions 16, 17, on the one hand, and the sharp-edged bowl edge regions 18, 19, on the other hand, are disposed opposite one another, in each instance, whereby the rounded bowl edge regions 16, 17 are disposed symmetrical to the piston pin axis B, in each instance (see FIG. 1).

From FIG. 1, it is furthermore evident that each of the four valve niches 12 is disposed in the piston crown 11 in such a manner that it cuts the circumferential bowl edge 15 in the transition region between a rounded bowl edge region 16 or 17 and a sharp-edged bowl edge region 18, 19.

In the exemplary embodiment, the rounded bowl edge regions 16, 17 have a radius $R_1$ of 2.5 mm, whereby the radius $R_1$ can vary in a range from 2.0 to 3.0 mm (see FIG. 3). In the exemplary embodiment, the sharp-edged bowl regions 18, 19 have a radius $R_2$ of 1.0 mm, whereby the radius $R_2$ can vary in a range from 0.5 to 1.5 mm (see FIG. 2).

From FIGS. 2 and 3, it is furthermore evident that the circumferential bowl edge 15 makes a transition into a planar circumferential surface 20. In this connection, the rounded bowl edge regions 16, 17 make a transition into a planar surface region 21 having a lesser height, and the sharp-edged bowl edge regions 18, 19 make a transition into a planar surface region 22 having a greater height. In the exemplary embodiment, the planar surface regions 21, 22 are oriented vertically, in other words parallel to the longitudinal piston axis, and form a cylinder mantle surface.

The planar surface regions 21, 22 make a transition into the circumferential undercut 14 at a defined point $P_{21}$, $P_{22}$, in each instance, with a sharp edge, i.e. essentially without any rounding. In the exemplary embodiment, the points $P_{21}$, $P_{22}$ have the same distance h from the bottom of the combustion bowl 13, in each instance. From this, it follows that the height of the planar surface regions 21, 22 depends on the size of the radii $R_1$ and $R_2$, respectively. The greater the radii $R_1$ and $R_2$, the less the height of the planar surface regions 21, 22. This means that the planar surface regions 21 that follow the rounded bowl edge regions 16, 17 always have a lesser height than the planar surface regions 22 that follow the sharp-edged bowl edge regions 18, 19.

The resulting circumferential bowl edge 15 is therefore composed of alternating rounded bowl edge regions 16, 17 and sharp-edged bowl edge regions 18, 19, which make a flowing transition into one another, in the exemplary embodiment. The circumferential bowl edge 15 makes a transition into a planar circumferential surface 20, which is composed of alternating planar surface regions 21 having a lesser height and planar surface regions 22 having a greater height, whereby the planar surface regions 21, also make a flowing transition into one another, in the exemplary embodiment. The planar circumferential surface 20 ensures that the fuel injected into the combustion chamber of a cylinder always impacts a planar surface region 21, 22, independent of the type and arrangement of the fuel injection nozzle, and therefore is atomized in particularly fine manner. At the same time, the rounded bowl edge regions 16, 17 ensure a reduction of the tensile and/or pressure stresses that occur in the circumferential bowl edge 15.

The invention claimed is:

1. A piston for an internal combustion engine, having a combustion bowl provided in the piston crown, which bowl has a circumferential undercut, whereby the bowl edge that connects the undercut with the piston crown alternately has rounded, and sharp-edged bowl edge regions wherein the circumferential bowl edge makes a transition, along its entire circumference, into a planar circumferential surface, which in turn makes a sharp-edged transition into the undercut, along its entire circumference and wherein the circumferential bowl edge has a total of two rounded bowl edge regions that lie opposite one another in the piston pin axis, and a total of two sharp-edged bowl edge regions that lie opposite one another perpendicular to the piston pin axis.

2. The piston according to claim 1, wherein the height of the planar circumferential surface is less along the rounded bowl edge regions than along the sharp-edged bowl edge regions.

3. The piston according to claim 2, wherein the planar surface regions having a lesser height and the planar surface regions having a greater height make a flowing transition into one another.

4. The piston according to claim 1, wherein the planar circumferential surface is in the form of a cylinder mantle.

5. The piston according to claim 1, wherein the rounded and the sharp-edged bowl edge regions make a flowing transition into one another.

6. The piston according to claim 1, wherein the rounded bowl edge regions have a radius of 2.0 to 3.0 mm.

7. The piston according to claim 1, wherein the sharp-edged bowl edge regions have a radius of 0.5 to 1.5 mm.

8. The piston according to claim 1, wherein the center point of the combustion bowl lies in the longitudinal piston axis.

9. The piston according to claim 1, wherein the piston crown is provided with one or more valve niches.

10. The piston according to claim 9, wherein each valve niche cuts the combustion bowl in a transition region between a sharp-edged and a rounded bowl edge region.

* * * * *